United States Patent [19]

Diehl et al.

[11] Patent Number: 5,055,387
[45] Date of Patent: Oct. 8, 1991

[54] SENSITIZING DYE FOR PHOTOGRAPHIC MATERIALS

[75] Inventors: Donald R. Diehl, Rochester; Michael C. Malec, Hilton, both of N.Y.

[73] Assignee: Eastman Kodak Company, Rochester, N.Y.

[21] Appl. No.: 492,147

[22] Filed: Mar. 13, 1990

[51] Int. Cl.⁵ .............................................. G03C 1/10
[52] U.S. Cl. ..................................... 430/591; 548/217
[58] Field of Search ......................... 548/217; 430/591

[56] References Cited

U.S. PATENT DOCUMENTS 2,153,169  4/1939  Brooker ............................ 430/570
4,900,653  2/1990  Factor et al. ...................... 430/522

Primary Examiner—Charles L. Bowers, Jr.
Assistant Examiner—Janet C. Baxter
Attorney, Agent, or Firm—Andrew J. Anderson

[57] ABSTRACT

Sensitizing dyes for photographic materials are disclosed. The dyes have the formula:

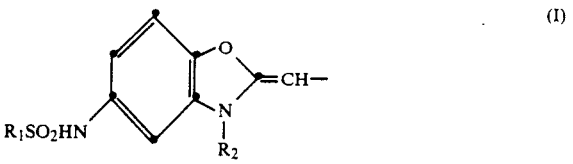

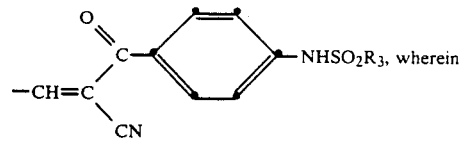

NHSO$_2$R$_3$, wherein

R$_2$ is substituted or unsubstituted alkyl or substituted or unsubstituted aryl, and R$_1$ and R$_3$ are each independently substituted or unsubstituted alkyl, at least one of R$_1$ and R$_3$ having at least about 5 carbon atoms.

4 Claims, No Drawings

SENSITIZING DYE FOR PHOTOGRAPHIC MATERIALS

FIELD OF THE INVENTION

This invention relates to photography, and specifically to spectral sensitization of silver halide emulsions.

BACKGROUND OF THE INVENTION

Silver halide photography usually involves the exposure of silver halide with light in order to form a latent image that is developed during photographic processing to form a visible image. Silver halide is intrinsically sensitive only to light in the blue region of the spectrum. Thus, when silver halide is to be exposed to other wavelengths of radiation, such as green or red light in a multicolor element or infrared radiation in an infrared-sensitive element, a spectral sensitizing dye is required. Sensitizing dyes are chromophoric compounds (usually cyanine dye compounds) that are adsorbed to the silver halide. They absorb light or radiation of a particular wavelength and transfer the energy to the silver halide to form the latent image, thus effectively rendering the silver halide sensitive to radiation of a wavelength other than the blue intrinsic sensitivity.

In many situations, it is also desirable to sensitize silver halide to blue light. This can be because the particular silver halide emulsion has low intrinsic sensitivity, because it is desired to alter the spectral response of the silver halide in the blue portion of the spectrum, or simply because greater blue sensitivity in addition to the intrinsic sensitivity of the silver halide is desired.

Cyanine dyes have often been proposed as blue sensitizers, but due to their tendency to cause post-processing retained dye stain, merocyanines have often been used instead. U.S. Pat. No. 2,153,169 describes one such merocyanine dye having the formula:

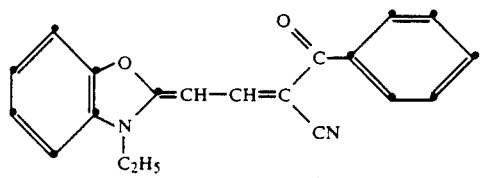

(A)

Such dyes, however, often do not provide silver halide with as high a sensitivity to blue light as may be desired, and they still exhibit some retained dye stain. It is thus an object of the present invention to provide a low-staining effective blue sensitizing dye for silver halide photographic materials.

SUMMARY OF THE INVENTION

According to the present invention, silver halide is sensitized with a dye having the formula:

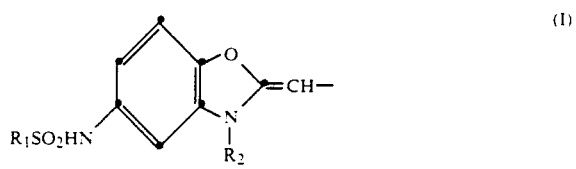

(I)

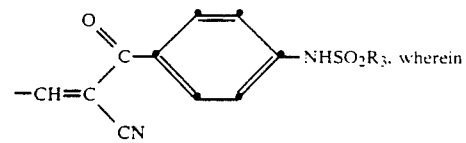

wherein $R_2$ is substituted or unsubstituted alkyl or substituted or unsubstituted aryl, and $R_1$ and $R_3$ are each independently substituted or unsubstituted alkyl, at least one of $R_1$ and $R_3$ having at least about 5 carbon atoms.

Dyes according to formula (I) are effective sensitizers for silver halide, and exhibit little post-processing retained dye stain.

DESCRIPTION OF THE PREFERRED EMBODIMENTS

According to formula (I), $R_2$ may be substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, p-chlorophenyl, and p-methoxyphenyl. Examples of alkyl include methyl, ethyl, propyl, isopropyl, butyl, hexyl, cyclohexyl, decyl, dodecyl, etc., and substituted alkyl groups (preferably a substituted lower alkyl containing from 1 to 6 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc.; a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc. The alkyl or aryl group may be substituted by one or more of the substituents on the above-described substituted alkyl groups.

$R_1$ and $R_3$ are substituted or unsubstituted alkyl, preferably of about 1 to 9 carbon atoms. Examples of these include methyl, ethyl, propyl, propyl, butyl, pentyl, hexyl, heptyl, octyl, nonyl, and isomers thereof. At least one of the $R_1$ and $R_3$ alkyl groups must have at least 5 carbon atoms. In a preferred embodiment, both $R_1$ and $R_3$ have less than about 7 carbon atoms. Substituents for the $R_1$ and $R_3$ alkyl groups include alkoxy, halogen (e.g., chloro), alkoxycarbonyl (e.g., methoxycarbonyl), and others that are known to those skilled in the art.

Examples of dyes according to formula (I) include:

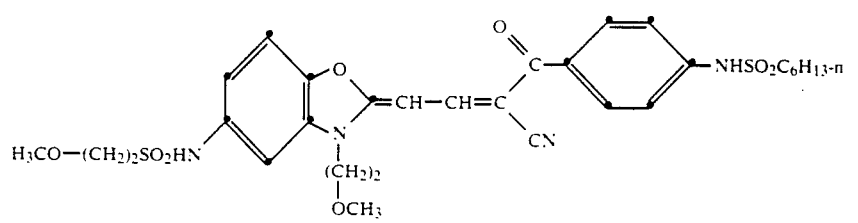
(1)
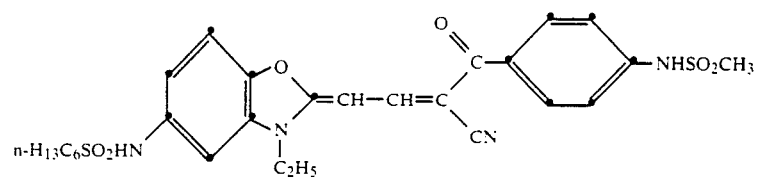
(2)
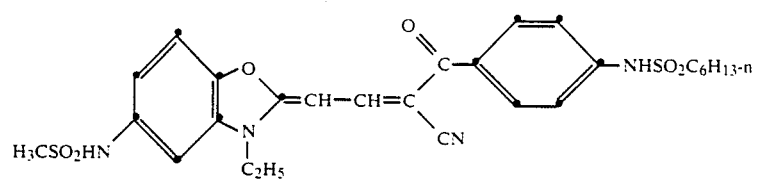
(3)
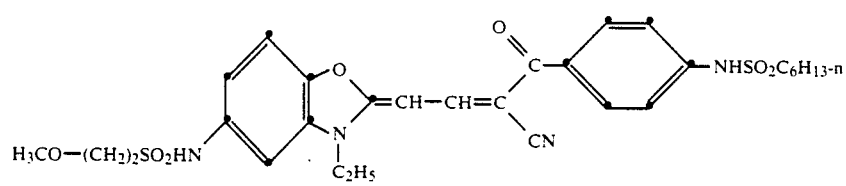
(4)
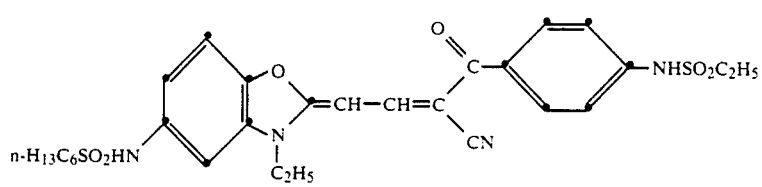
(5)
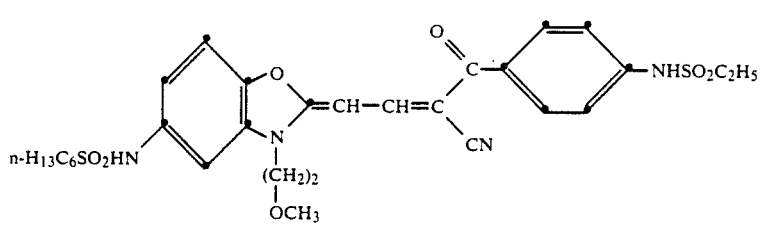
(6)
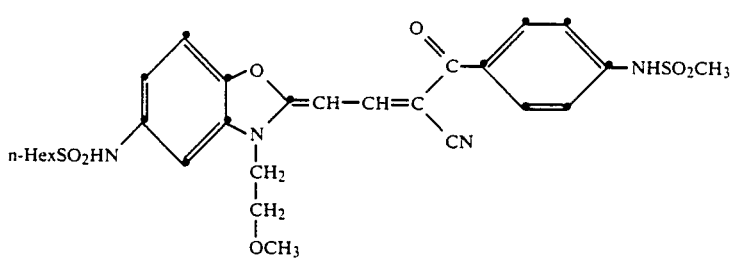
(7)
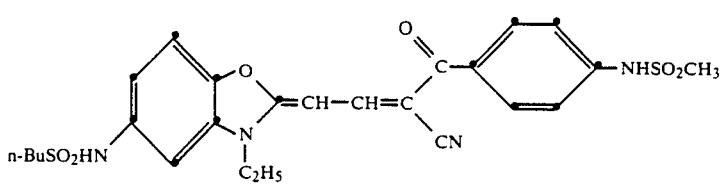
(8)

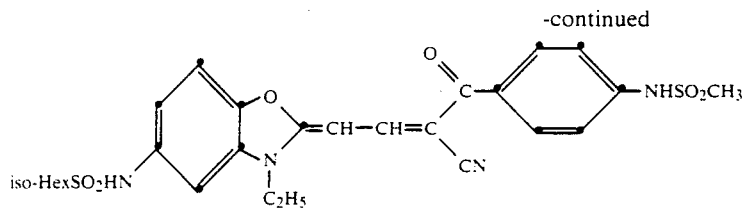
(9)
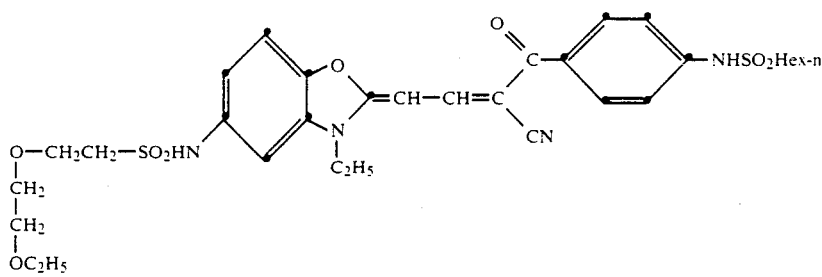
(10)
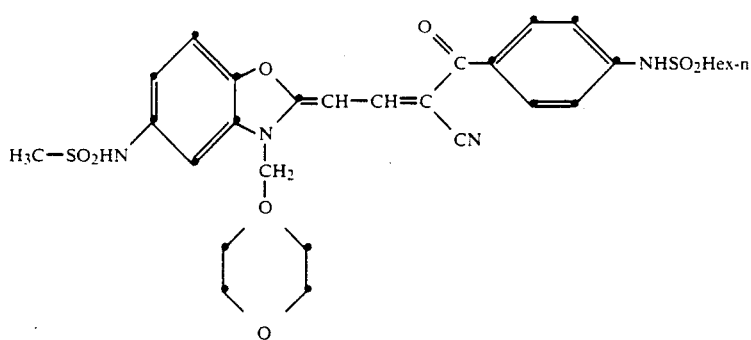
(11)
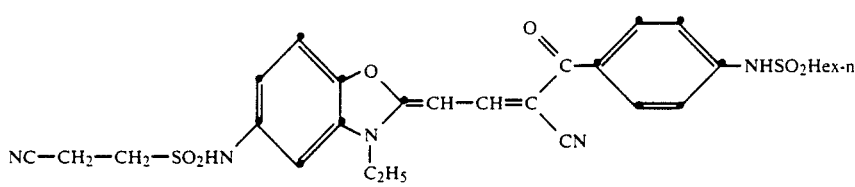
(12)
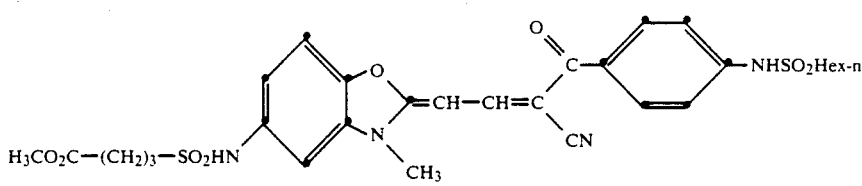
(13)
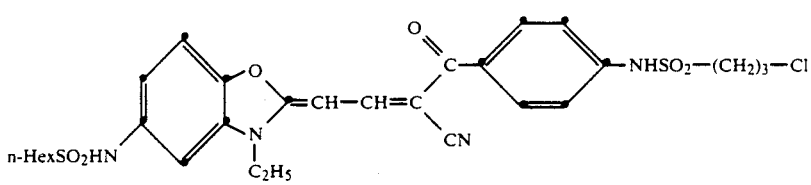
(14)
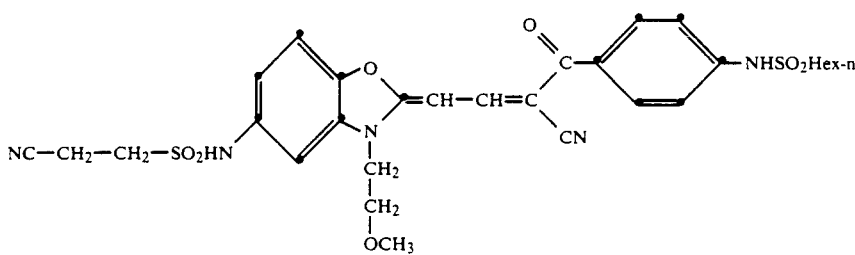
(15)

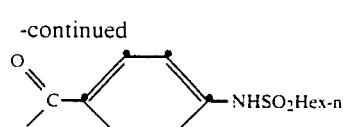
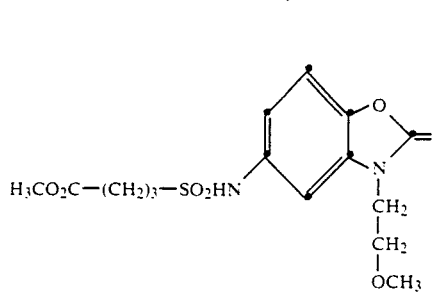

(16)

The amount of sensitizing dye of formula (I) that is useful in the invention is preferably in the range of 0.1 to 1.0 millimoles per pole of silver halide and more preferably from 0.2 to 0.7 millimoles per mole of silver halide. Optimum dye concentrations can be determined by methods known in the art.

The dyes of formula (I) can be synthesized by techniques known in the art, such as described in Hamer, Cyanine Dyes and Related Compounds, 1964 and James, The Theory of the Photographic Process 4th, 1977. The synthesis of a representative dyes of formula (I) is set forth in the Examples below.

The silver halide that to be sensitized by the dye of formula (I) advantageously sensitize can be of any known type, such as silver bromoiodide, silver bromide, silver chloride, silver chlorobromide, and the like.

Essentially any type of silver halide grains can be used in the practice of the invention, although since the dye is low staining, it may be advantageously used in combination with tabular grain emulsions, which have greater surface area, allowing for greater amounts of dye to be used. Also, the dyes of formula (I) provide effective sensitization of cubic silver halide grains, so in a preferred embodiment, a cubic silver halide emulsion is used. The grain size of the silver halide may have any distribution known to be useful in photographic compositions, and may be either polydisperse or monodisperse. The mean grain diameter is preferably from 0.05 $\mu$m to 1.5 $\mu$m.

The silver halide grains to be used in the invention may be prepared according to methods known in the art, such as those described in Research Disclosure, Item 308119, December, 1989 [hereinafter referred to as Research Disclosure I] and Mees, The Theory of the Photographic Process. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in Research Disclosure I and the references cited therein.

The silver halide may be sensitized by the dye of formula (I) by any method known in the art, such as described in Research Disclosure I. The dye may added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (e.g., 2 hours).

The dye of formula (I) may be used by itself to sensitize silver halide, or it may be used in combination with other sensitizing dyes to provide the silver halide with sensitivity to broader or different ranges of wavelengths of light than silver halide sensitized with a single dye or to supersensitize the silver halide.

In a preferred embodiment of the invention, the dye of formula (I) is used to sensitize silver halide in photographic emulsions, which can be coated as layers on photographic elements. Essentially any type of emulsion (e.g., negative-working emulsions such as surface-sensitive emulsions or unfogged internal latent image-forming emulsions, direct-positive emulsions such as surface fogged emulsions, or others described in, for example, Research Disclosure I.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin), phthalated gelatin, and the like), and others as described in Research Disclosure I. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in Research Disclosure I. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in Research Disclosure, June, 1975, item 13452 and U.S. Pat. No. 3,772,031.

Other addenda include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion may also include brighteners, such as stilbene brighteners. Such brighteners are well-known in the art and are used to counteract dye stain, although the dyes of formula (I) offer reduced stain offer reduced dye stain even if no brightener is used.

The emulsion layer containing silver halide sensitized with the dye of formula (I) can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements comprising the composition of the invention can be black and white or color. A color photographic element generally contains three silver emulsion layers or sets of layers: a blue-sensitive layer having a yellow color coupler associated therewith, a green-sensitive layer having a magenta color coupler associated therewith, and a red-sensitive layer having a cyan color coupler associated therewith. The photographic composition of the invention is advantageously utilized in a green-sensitive layer of a color photographic element. These color image-forming couplers along with other element configurations are well-known in the art and are disclosed, for example, in *Research Disclosure I*.

Photographic elements comprising the composition of the invention can be processed in any of a number of well-known photographic processes utilizing any of a number of well-known processing compositions, described, for example, in *Research Disclosure I* or in James, *The Theory of the Photographic Process* 4th, 1977.

The invention is described further in the following Examples.

SYNTHESIS EXAMPLES

Intermediate 1: 2-Methoxyethyl sulfonyl chloride

Into a 2 L 3 neck r.b.f. equipped with a condenser, heating mantle and mechanical stirring shaft containing 400 mL of 3A ethanol was added 146.2 ml (1.6 Mol) of 2-methoxyethylchloride and 121.8 grams (1.6 Mol) of thiourea. The resulting solution was heated to reflux and held at reflux overnight. After this time the ethanol was removed under reduced pressure from the crude reaction leaving an oily residue. The oil was dissolved in 300 mL of water and 80 mL of 1 Molar aqueous sodium hydroxide was added all at once. Then, approximately 80 mL of concentrated hydrochloric acid was added portionwise without monitoring of reaction temperature. Then, 300 mL of glacial acetic acid was added and the resulting mixture was poured into a 2 L 3 neck r.b.f. equipped with gas inlet bubbler, gas outlet tube, thermometer and mechanical stirrer. The reaction was immersed in an ice/water bath and 200 grams of ice was added to the reaction flask. The ice/reaction mixture was stirred and chlorine gas was bubbled into the reaction at a vigorous rate. Approximately 500 grams of chlorine bubbled into the reaction while maintaining the temperature below 20° C. After total addition of chlorine, the yellow product mixture was extracted with 7×200 mL of dichloromethane and the organic extract was dried over magnesium sulfate overnight. The magnesium sulfate was removed by gravity filtration and the dichloromethane was removed under reduced pressure. The product was isolated by vacuum distillation collecting the fraction at 78°–84° C. at 3–4 mm Hg to afford 161.4 grams (1.02 Mol, 63.6% yield) of desired product.

Intermediate 2: Hexanesulfonyl chloride

Into a 1.0 L round bottom flask fitted with a chlorine gas inlet tube, gas outlet, thermometer, and mechanical stirrer was added 60 grams (0.5 Mol) of hexanethiol and 100 mL of glacial acetic acid. To this was added 50 grams of ice and the flask was placed in an ice-ethanol bath. Then, the chlorine gas was bubbled in. An exothermic reaction ensued and the rate of chlorine gas flow was adjusted so that the temperature of the reaction never exceeded 15° C. After 2 hours the chlorine gas flow was stopped. The product mixture was poured into a separatory funnel and the organic layer was separated from the water layer. The water layer was extracted 3×100 mL of diethyl ether which was combined with the previously saved organic layer. The combined organic layers were washed with sodium bisulfite solution, water and brine, then dried over magnesium sulfate. After concentration in vacuo, the product was collected by vacuum distillation taking the fraction boiling at 70°–74° C./0.25 mm Hg to give 81.7 grams (0.43 Mol, 87% yield) of water clear colorless product.

Intermediate 3: 2-Methoxyethyl 4-bromobenzenesulfonate

Into a 125 mL erlenmyer flask immersed in an ice-/water bath at 5° C. was added 14.2 mL (0.18 Mol) of 2-methoxyethanol and 40 mL of anhydrous pyridine. To the stirred solution was added 51 grams (0.20 Mol) of bromobenzenesulfonyl chloride in portions while keeping the temperature of the reaction below 7° C. After total addition the sulfonyl chloride, the reaction was stirred for one hour and allowed to warm to 10° C. Then the product mixture was poured into 200 mL of ice water and stirred rapidly for 30 min. The mother liquors were decanted and the remaining oily product was treated again with 200 mL of water and rapidly stirred for 30 min. To this mixture was added 400 mL of diethyl ether, and after brief stirring the organic layer was separated from the aqueous layer. The aqueous layer was extracted with 200 mL of diethyl ether and the combined organic layers were dried over magnesium sulfate overnight in the refrigerator at 5° C. The magnesium sulfate was removed by gravity filtration and the ether was removed in vacuo to afford 48 grams (0.16 Mol, 88% yield) of the desired product as a thick oil. This material was noted to crystallize when stored in the refrigerator for extended periods of time.

Intermediate 4: 4-Hexylsulfonamidobenzoylacetonitrile

A solution of 3.7 grams (0.02 Mol) hexane sulfonyl chloride, 3.2 grams (0.02 Mol) 4-aminobenzoylacetonitrile and 5 mL of pyridine was stirred at 0° C. for 1.5 hours. The resulting very thick brown solution was dissolved in 15 mL of methanol and dropwise added to 100 mL of 2N hydrochloric acid at 0° C. A tan precipitate formed which was stirred for 30 minutes, then filtered and washed with water and dried for 2 hours at 50° C./10 mm Hg to give 6.9 grams of crude product. This was recrystallized from aqueous ethanol to give 4.2 grams (13.6 mMol, 68% yield) of pure product, m.p.=125°-127° C.

Intermediate 5:
5-(2-Methoxyethylsulfonamido)-2-methylbenzoxazole

Into a 1.0 L round bottom flask equipped with mechanical stirrer, addition funnel, thermometer and nitrogen inlet tube was placed 100 grams (0.67 Mol) of 5-amino-2-methylbenzoxazole and 350 mL of pyridine. The slurry was stirred in an ice/ethanol bath at 0° C. then 110 grams (0.69 Mol) of *Intermediate* 1 was added dropwise so as to maintain a reaction temperature below 7° C. The reaction was stirred at 0° C. for two hours then the resulting red colored mixture was poured into 1.0 L of ethyl acetate. The slurry was stirred for 30 minutes then filtered and the collected solids were discarded. The filtrate was extracted with 4×200 mL of 10% hydrochloric acid and the organic phase was collected and dried over magnesium sulfate. The solvents were removed in vacuo to afford 140 grams (0.52 Mol, 76.7% yield) of desired product as a tan solid.

Intermediate 6:
3-Ethyl-5-hexylsulfonamido-2-methylbenzoxazolium p-toluenesulfonate A mixture of 60 grams (0.2 Mol) 5-hexylsulfonamido-2-methylbenzoxazole and 44 grams (0.22 Mol) ethyl p-toluenesulfonate was heated in a round bottom flask at 150° C. for 5 minutes. Upon cooling to room temperature the crude brown mass almost solidified. The product was dissolved in 25 mL methanol and poured into 300 mL diethyl ether with rapid stirring for one hour. The solid precipitate was chilled at 2° C. for 12 hours, then filtered. The tan powder was thoroughly washed with ether and recrystallized from 200 mL hot isopropyl alcohol to yield 23.4 grams (47 mMol, 23% yield) of white crystalline product, m.p.=159°-161° C.

Intermediate 7:
N-(2-Methoxyethyl)-5-(2-methoxyethylsulfonamido)-2-anilinovinylbenzoxazolium bromobenzenesulfonate a) Into a 1.0 L round bottom flask was placed 65.0 grams (0.22 Mol) of Intermediate 3 and 50.0 grams (0.18 Mol) of Intermediate 5. The mixture was stirred and heated to 185° C. under a condenser for 30 minutes. The resulting mixture was cooled to room temperature and used as is in the following step; b) To 104 grams of the crude quaternary salt was added 55.0 grams (0.28 Mol) of diphenylformamidine. The mixture was stirred and heated to 185° C. under a condenser for 30 minutes. The product mixture was cooled to 90° C. and 250 mL of isopropyl alcohol was added. The slurry was refluxed for 15 minutes then cooled to room temperature. The resulting brown-orange crystalline product was chilled, collected filtration, and dried to afford 103.5 grams of crude product. This was further purified by slurrying in 1.0 L. of ethyl acetate at reflux for 30 min. After chilling, the resulting orange crystalline solid was collected by filtration and dried to afford 88.5 grams (0.13 Mol, 71.6% yield) of desired product.

SYNTHESIS EXAMPLE 1-DYE 1

4'-Hexylsulfonamido-2-[(5-(2-methoxyethylsulfonamido)-3-(2-methoxyethyl)-2-benzoxazolinylidene)ethylidene]-benzoyl-acetonitrile A mixture of 20.0 grams (0.029 Mol) Intermediate 4, 8.76 grams (0.028 Mol) Intermediate 7 and 150 mL of methanol were mixed together in a 500 mL round bottom flask equipped with mechanical stirrer, condenser, heating mantle and nitrogen inlet. To the stirred mixture at room temperature was added 8.5 mL (0.09 Mol) of acetic anhydride and 12.5 mL (0.09 Mol) of triethylamine. The reaction was heated to reflux and held at reflux for one hour. Then, 200 mL of water was added and the crude product mixture was cooled to room temperature. The precipitated amorphous product was slurried in methanol at reflux and then chilled in ice to give 5.63 grams of crude product dye. This was further purified by a second slurry in methanol at reflux, and two recrystallizations from glacial acetic acid to afford 2.2 grams (3.4 mMol, 7.3% yield) of pure Dye 1, m.p.=151°-154° C., absorbance maximum=444 nm (MeOH), extinction=78,400. Elemental analysis: Theory: C=55.7, H=5.9, N=8.7; Found: C=55.5, H=5.8, N=8.3.

SYNTHESIS EXAMPLE 2-DYE 7

4'-Methylsulfonamido-2-[(5-(hexylsulfonamido)-3-(2-methox-yethyl)-2-benzoxazolinylidene)ethylidene]-benzoylacetoni-trile A mixture of 10.0 grams (14.4 mMol) N-(2-methoxyethyl)-5-(hexylsulfonamido)-2-anilinovinylbenzoxazolium bromobenzenesulfonate, 3.57 grams (15.0 mMol) p-methylsulfonamidobenzoylacetonitrile and 75 mL of methanol were stirred together in a round bottom flask with mechanical stirrer, heating mantle, condenser, and nitrogen inlet. Then, 4.3 mL (0.045 Mol) of acetic anhydride and 6.2 mL (0.045 Mol) of triethylamine were added. The reaction was heated to reflux and 50 mL of water was added. After 30 min, the reaction was cooled to room temperature and chilled. The precipitated solid was collected and dried to give 6.20 grams of crude product. After twice recrystallizing from hot glacial acetic acid, 4.20 grams (6.9 mMol, 48.4% yield) of pure product was obtained, m.p.=239°-241° C., absorbance maximum=444 nm (MeOH), extinction=78,100, Elemental analysis: Theory: C=55.8, H=5.7, N=9.3, S=10.6; Found: C=55.6, H=5.7, N=8.7, S=10.2.

PHOTOGRAPHIC EXAMPLE

Photographic elements containing silver halide emulsions sensitized with dyes according to formula (I) and comparison dyes A and B dye A (illustrated above) according to U.S. Pat. No. 2,153,169 as set forth in Table I were prepared as follows: An AgBrI (97:3) 0.2 μm cubic emulsion was chemically sensitized with sulfur plus gold compounds and spectrally sensitized with a dye as set forth in Table I below at a level of 0.8 mmole/mole Ag. This emulsion was coated at a level of 9.3 mg Ag/m$^2$ and 63 mg gelatin/m$^2$ over a gel pad having 46 mg gelatin/m$^2$. The element was exposed using a horton-type sensitometer for one second, and processed in Kodak RP X-Omat ® processing for 30 seconds at 95° F., and the photographic speed was determined. The contribution to photographic speed from the sensitizing dye was then calculated, and is presented below in Table I. Stain was determined by subjecting identical, but unexposed elements to the photographic processing, and measuring the optical density.

TABLE I

| Dye | λ-Max | Speed | Stain |
|-----|-------|-------|-------|
| A | 400 | 200 | 0.038 |
| 1 | 480 | 224 | 0.025 |
| 2 | 480 | 204 | 0.015 |
| 3 | 480 | 186 | 0.032 |
| 4 | 480 | 198 | 0.024 |
| 7 | 470 | 186 | 0.027 |
| 8 | 480 | 199 | 0.025 |

The data shown in Table I demonstrate that the dyes of formula (I) provide significantly greater photographic speed, significantly lower stain, or both, compared to the comparison dye.

The invention has been described in detail with particular reference to preferred embodiments thereof, but it will be understood that variations and modifications can be effected within the spirit and scope of the invention.

What is claimed is:

1. A photographic element comprising a support having thereon at least one silver halide emulsion layer sensitized with a dye having the formula:

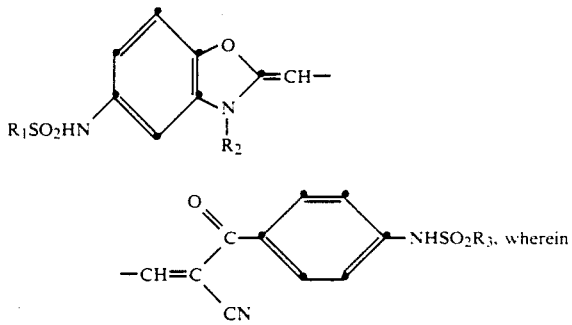

$R_2$ is substituted or unsubstituted alkyl or substituted or unsubstituted aryl, and $R_1$ and $R_3$ are each independently substituted or unsubstituted alkyl, at least one of $R_1$ and $R_3$ having at least about 5 carbon atoms.

2. A photographic element according to claim 1 wherein $R_2$ is substituted or unsubstituted alkyl of from about 1 to 6 carbon atoms.

3. A photographic element according to claim 2 wherein one of $R_1$ and $R_3$ is substituted or unsubstituted alkyl of from about 1 to 9 carbon atoms and the other of $R_1$ and $R_3$ is substituted or unsubstituted alkyl of from about 5 to 9 carbon atoms.

4. A photographic element according to claim 1 wherein one of $R_1$ and $R_3$ is substituted or unsubstituted alkyl of from about 1 to 9 carbon atoms and the other of $R_1$ and $R_3$ is substituted or unsubstituted alkyl of from about 5 to 9 carbon atoms.

* * * * *